United States Patent
Ogo et al.

(10) Patent No.: US 10,690,944 B2
(45) Date of Patent: Jun. 23, 2020

(54) SPECTACLE LENS THAT REFLECTS BLUE LIGHT, AND SPECTACLES EQUIPPED WITH THE SPECTACLE LENS

(71) Applicant: HOYA LENS THAILAND LTD., Prachatipat, Thanyaburi, Pathumthani (TH)

(72) Inventors: Yoichi Ogo, Tokyo (JP); Keiji Nishimoto, Tokyo (JP); Naomi Ogawa, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 15/532,046

(22) PCT Filed: Dec. 1, 2015

(86) PCT No.: PCT/JP2015/083783
§ 371 (c)(1),
(2) Date: May 31, 2017

(87) PCT Pub. No.: WO2016/088763
PCT Pub. Date: Jun. 9, 2016

(65) Prior Publication Data
US 2017/0299896 A1    Oct. 19, 2017

(30) Foreign Application Priority Data
Dec. 1, 2014   (JP) ................................ 2014-243559

(51) Int. Cl.
*G02C 7/10*    (2006.01)
*G02B 5/28*    (2006.01)
(Continued)

(52) U.S. Cl.
CPC .............. *G02C 7/104* (2013.01); *G02B 1/115* (2013.01); *G02B 5/26* (2013.01); *G02B 5/28* (2013.01); *G02C 7/10* (2013.01)

(58) Field of Classification Search
CPC ... G02C 7/02; G02C 7/10–7/108; G02B 5/26; G02B 5/28; G02B 1/115
(Continued)

(56) References Cited

U.S. PATENT DOCUMENTS 4,852,974 A * 8/1989 Melzig ................... G02B 1/111
                                                  359/580
6,793,339 B1   9/2004 Yip et al.
(Continued)

FOREIGN PATENT DOCUMENTS

CA         2886332 A1    4/2014
CN     101595421 A      12/2009
(Continued)

OTHER PUBLICATIONS

Nov. 22, 2017 Office Action issued in Australian Patent Application No. 2015356057.
(Continued)

*Primary Examiner* — Zachary W Wilkes
(74) *Attorney, Agent, or Firm* — Oliff PLC

(57) ABSTRACT

Provided a spectacle lens including a lens base material and a multilayer film provided on each surface of an eyeball-side surface and an object-side surface of the lens base material, in which a mean reflectance $R_{B(object)}$ in a wavelength range of 430 to 450 nm measured on the object-side surface of the spectacle lens is equal to or more than 1.00%, and a mean reflectance $R_{UV(eye)}$ in a wavelength range of 280 to 380 nm measured on the eyeball-side surface of the spectacle lens is less than or equal to 15.00%.

10 Claims, 2 Drawing Sheets

(51) Int. Cl.
*G02B 5/26* (2006.01)
*G02B 1/115* (2015.01)

(58) Field of Classification Search
USPC ............. 351/159.65, 159.49, 159.59, 159.6, 351/159.62
See application file for complete search history.

(56) References Cited

U.S. PATENT DOCUMENTS

| | | | |
|---|---|---|---|
| 8,690,322 B2* | 4/2014 | Cado | G02B 1/115 351/159.62 |
| 2013/0222913 A1 | 8/2013 | Tomoda et al. | |
| 2014/0347625 A1* | 11/2014 | Tomoda | G02C 7/02 351/159.57 |
| 2015/0198821 A1* | 7/2015 | Miyamoto | G02B 5/0816 351/159.62 |
| 2015/0261010 A1* | 9/2015 | Kudla | G02B 5/23 351/159.61 |
| 2016/0124118 A1 | 5/2016 | Takahashi | |

FOREIGN PATENT DOCUMENTS

| | | |
|---|---|---|
| JP | 2012-093689 A | 5/2012 |
| JP | 2012-128135 A | 7/2012 |
| JP | 2013-008052 A | 1/2013 |
| JP | 2013-097160 A | 5/2013 |
| JP | 2015-45743 A | 3/2015 |
| WO | 2013/122253 A1 | 8/2013 |
| WO | 2013/171435 A1 | 11/2013 |
| WO | 2014/057226 A1 | 4/2014 |
| WO | 2014/208412 A1 | 12/2014 |
| WO | 2015/029644 A1 | 3/2015 |

OTHER PUBLICATIONS

Mar. 8, 2016 Search Report issued in International Patent Application No. PCT/JP2015/083783.
Jun. 6, 2017 International Preliminary Report on Patentability issued in International Patent Application No. PCT/JP2015/083783.
Feb. 20, 2018 Office Action issued in Canada Patent Application No. 2,969,346.
Jun. 15, 2018 Extended European Search Report issued in European Patent Application No. 15865958.1.
Citek, K. "Anti-Reflective Coatings Reflect Ultraviolet Radiation" Optometry—Journal of the American Optometric Association, vol. 79, No. 3, pp. 143-148, Feb. 2008.
Apr. 27, 2018 Office Action Issued in Korean Patent Application No. 10-2017-7014635.
May 29, 2018 Office Action Issued in Japanese Patent Application No. 2016-562640.
May 15, 2019 Office Action issued in European Patent Application No. 15865958.1.
Jan. 7, 2019 Office Action issued in Korean Patent Application No. 10-2017-7014635.
Jan. 21, 2019 Office Action issued in Canadian Patent Application No. 2969346.
Oct. 12, 2018 Office Action issued in Chinese Patent Application No. 201580065248.9.
Nov. 13, 2018 Office Action issued in Japanese Patent Application No. 2016-562640.
Oct. 16, 2018 Office Action issued in Korean Patent Application No. 10-2017-7014635.
Jul. 1, 2019 Office Action issued in Chinese Patent Application No. 201580065248.9.
Dec. 31, 2019 Office Action issued in Canadian Patent Application No. 2,969,346.
Feb. 24, 2020 Office Action issued in European Patent Application No. 15 865 958.1.

* cited by examiner

SPECTACLE LENS THAT REFLECTS BLUE LIGHT, AND SPECTACLES EQUIPPED WITH THE SPECTACLE LENS

CROSS-REFERENCE TO RELATED APPLICATION

This application is based upon and claims the benefit of priority from Japanese patent application No. 2014-243559, filed on Dec. 1, 2014, the disclosure of which is incorporated herein in its entirety especially by reference.

TECHNICAL FIELD

The present disclosure relates to a spectacle lens and spectacles equipped with the spectacle lens.

BACKGROUND ART

In recent years, monitor screens of digital devices have migrated from cathode-ray tubes to liquid crystals and recently to LED liquid crystals. However, liquid crystal monitors, especially LED liquid crystal monitors, intensely emit short-wavelength light of approximately 430 to 450 nm, called blue light. Thus, in order to effectively mitigate asthenopia or ocular pain which occurs due to long time use of digital devices, it is desirable to take measures against blue light. Note that, blue light is light having the wavelength of 430 to 450 nm in the following description.

In this regard, JP 2012-093689 A or its English family member U.S. 2013/222913 A1, the disclosure of which is incorporated herein in its entirety especially by reference, proposes an optical product including a multilayer film having a characteristic of reflecting light having the wavelength of 400 to 450 nm including the wavelength range of blue light.

SUMMARY

As measures against blue light, by imparting a characteristic of reflecting blue light to a spectacle lens surface, the amount of blue light entering the eyes of a wearer is reduced through the spectacle lens, and which can mitigate the burden of blue light on the eyes. If a wearing feeling of such a spectacle lens can be improved, it is possible to provide a high-value added spectacle lens in the market.

Thus, a purpose of the present disclosure is to provide a spectacle lens capable of mitigating the burden of blue light on the eyes and having a good wearing feeling.

An aspect of the present disclosure relates to a spectacle lens including a lens base material and a multilayer film provided on each surface of an eyeball-side surface and an object-side surface of the lens base material, in which a mean reflectance $R_{B(object)}$ in a wavelength range of 430 to 450 nm measured on the object-side surface of the spectacle lens is equal to or more than 1.00%, and a mean reflectance $R_{UV280\text{-}380\ nm(eye)}$ in a wavelength range of 280 to 380 nm measured on the eyeball-side surface of the spectacle lens is less than or equal to 15.00%.

Another aspect of the present disclosure relates to a spectacle lens including a lens base material and a multilayer film provided on each surface of an eyeball-side surface and an object-side surface of the lens base material, in which a mean reflectance $R_{B(object)}$ in a wavelength range of 430 to 450 nm measured on the object-side surface of the spectacle lens is equal to or more than 1.00%, and a mean reflectance $R_{UV295\text{-}380\ nm((eye)}$ in a wavelength range of 295 to 380 nm measured on the eyeball-side surface of the spectacle lens is less than or equal to 20.00%.

The inventors made intensive studies to achieve the above purpose, and have newly found a spectacle lens according to an aspect of the present disclosure.

In the spectacle lens, the mean reflectance $R_{B(object)}$ in the wavelength range of 430 to 450 nm measured on the object-side surface is equal to or more than 1.00%. Hereinafter, such a reflection spectral characteristic is also referred to as a "blue light reflectivity". Since the amount of blue light emitted from monitors of digital devices such as LED liquid crystal monitors and entering the eyes of a wearer of spectacles can be reduced by imparting the blue light reflectivity to the object-side surface of the spectacle lens, it is possible to effectively mitigate asthenopia or ocular pain which occurs due to long time use of digital devices.

Furthermore, in the spectacle lens, the mean reflectance $R_{UV280\text{-}380\ nm(eye)}$ in the wavelength range of 280 to 380 nm measured on the eyeball-side surface is less than or equal to 15.00%, or the mean reflectance $R_{UV295\text{-}380\ nm((eye)}$ in the wavelength range of 295 to 380 nm measured on the eyeball-side surface is less than or equal to 20.00%. Note that, the spectacle lens according to an aspect of the present disclosure satisfies at least either of, or may satisfy both $R_{UV280\text{-}380\ nm(eye)}$ is less than or equal to 15.00% or/and $R_{UV295\text{-}380\ nm((eye)}$ is less than or equal to 20.00%. Hereinafter, the reflection spectral characteristic which satisfies at least either of $R_{UV280\text{-}380\ nm(eye)}$ is less than or equal to 15.00% or $R_{UV295\text{-}380\ nm((eye)}$ is less than or equal to 20.00% is also referred to as an "ultraviolet low reflectivity". The wavelength ranges of 280 to 380 nm and 295 to 380 nm are the wavelength range of ultraviolet. The light entering the eyes of a wearer of spectacles is not limited to the light incident from the object-side surface, and the light incident from the rear side of the wearer of spectacles and reflected on the eyeball-side surface can enter the eyes. The energy of light is stronger and easily scattered as the light has a shorter wavelength, which heavily burdens the eyes. Thus, ultraviolet having a shorter wavelength than blue light more heavily burden the eyes than blue light. If such ultraviolet enters the eyeball-side surface of a spectacle lens from the rear side of a wearer of spectacles and most of the ultraviolet is reflected, a lot of ultraviolet enters the eyes of the wearer of spectacles, and which heavily burdens the eyes. In contrast, since the spectacle lens in an aspect of the present disclosure can suppress the reflection of ultraviolet on the eyeball-side surface by confining the mean reflectance in the wavelength range which is the wavelength range of ultraviolet within the above range on the eyeball-side surface, and it is possible to reduce the amount of ultraviolet reflected on the eyeball-side surface and entering the eyes.

As described above, according to the spectacle lens, it is possible to suppress both blue light incident from the front side of the spectacle lens and ultraviolet incident from the rear side from burdening the eyes.

In an aspect, $R_{B(object)}$ is equal to or more than 2.00% and less than or equal to 10.00%.

In an aspect, a mean reflectance $R_{B(eye)}$ in a wavelength range of 430 to 450 nm measured on the eyeball-side surface of the spectacle lens is equal to or more than 1.00%. In other words, in an aspect, the spectacle lens has blue light reflectivity on both the object-side surface and the object-side surface. Thus, it is preferable to impart the blue light reflectivity to the eyeball-side surface of the spectacle lens, because the amount of blue light entering the eyes can be reduced by reflecting, on the eyeball-side surface, the blue light entering the object-side surface of the spectacle lens and passing through the spectacle lens without being reflected on the object-side surface. Furthermore, since the spectacle lens surface to which the blue light reflectivity is imparted becomes bluish, it is preferable to impart the blue light reflectivity to the eyeball-side surface as well as the object-side surface from the perspective for obtaining a spectacle lens having the smaller difference between both surfaces of the object-side surface and the eyeball-side surface in color and a good appearance.

In an aspect, $R_{B(eye)}$ is equal to or more than 2.00% and less than or equal to 10.00%.

In an aspect, a maximum value of a reflectance in a wavelength range of 380 to 500 nm measured on the eyeball-side surface of the spectacle lens is in a wavelength range of 400 to 480 nm. The reflection spectrum obtained by measurement on a surface having the blue light reflectivity and reflecting a lot of ultraviolet has a spectral shape in which the reflectance becomes larger from the wavelength range of blue light (430 to 450 nm) toward the wavelength range of ultraviolet (280 to 380 nm), and the maximum reflectance in the wavelength range of 380 nm to 500 nm tends to be the reflectance of the wavelength 380 nm. In contrast, in the reflection spectrum obtained by measurement on a surface having the ultraviolet low reflectivity as well as the blue light reflectivity, the maximum reflectance in the wavelength range of 380 to 500 nm can be the reflectance of a wavelength in the wavelength range of 400 to 480 nm.

In an aspect, a mean reflectance in a wavelength range of 520 to 580 nm measured on the eyeball-side surface of the spectacle lens and a mean reflectance in a wavelength range of 520 to 580 nm measured on the object-side surface each are less than or equal to 0.60%, and a mean reflectance in a wavelength range of 580 to 780 nm measured on the eyeball-side surface of the spectacle lens and a mean reflectance in a wavelength range of 580 to 780 nm measured on the object-side surface each are less than or equal to 3.00%.

The wavelength range of 520 to 580 nm is the wavelength range of the light called green light. Furthermore, the wavelength range of 580 to 780 nm is the wavelength range of the light called red light. The surface having a higher reflectance in the wavelength range of green light tends to be greenish, and the surface having a higher reflectance in the wavelength range of red light tends to become reddish. Thus, in the spectacle lens to each surface of which the blue light reflectivity is imparted, when the reflectance in the wavelength range of green light or red light is higher on one surface than the other surface, greenishness or reddishness is added to the surface having the higher reflectance in addition to bluishness added by imparting the blue light reflectivity, and the large difference between the one surface and the other surface of the spectacle lens in color is caused. In contrast, in an aspect, by lowering the reflectance in each wavelength range on each surface of the eyeball-side surface and the object-side surface as described above, it is possible to obtain the spectacle lens having the small difference between the eyeball-side surface and the object-side surface in color and a good appearance.

In an aspect, a dominant wavelength measured on the eyeball-side surface of the spectacle lens and a dominant wavelength measured on the object-side surface each are in a wavelength range of 400 to 500 nm. The dominant wavelength will be described later.

In an aspect, the multilayer film provided on the eyeball-side surface and the multilayer film provided on the object-side surface each are a multilayer film in which a plurality of coats including an inorganic material as a principal component is laminated.

In an aspect, the multilayer film includes at least one laminated structure in which a coat including silicon oxide as a principal component and a coat including zirconium oxide as a principal component are adjacent.

In an aspect, the multilayer film includes at least one laminated structure in which a coat including silicon oxide as a principal component and a coat including niobium oxide as a principal component are adjacent.

In an aspect, the multilayer film includes at least one layer of a coat including conductive oxide as a principal component.

In an aspect, the coat is a vapor deposition film.

Another aspect of the present disclosure relates to spectacles including a spectacle lens according to an aspect of the present disclosure and a frame equipped with the spectacle lens.

According to an aspect of the present disclosure, it is possible to provide a spectacle lens having a blue light reflectivity on an object-side surface and an ultraviolet low reflectivity on an eyeball-side surface.

DESCRIPTION OF EMBODIMENTS

[Spectacle Lens]

Figure 1:
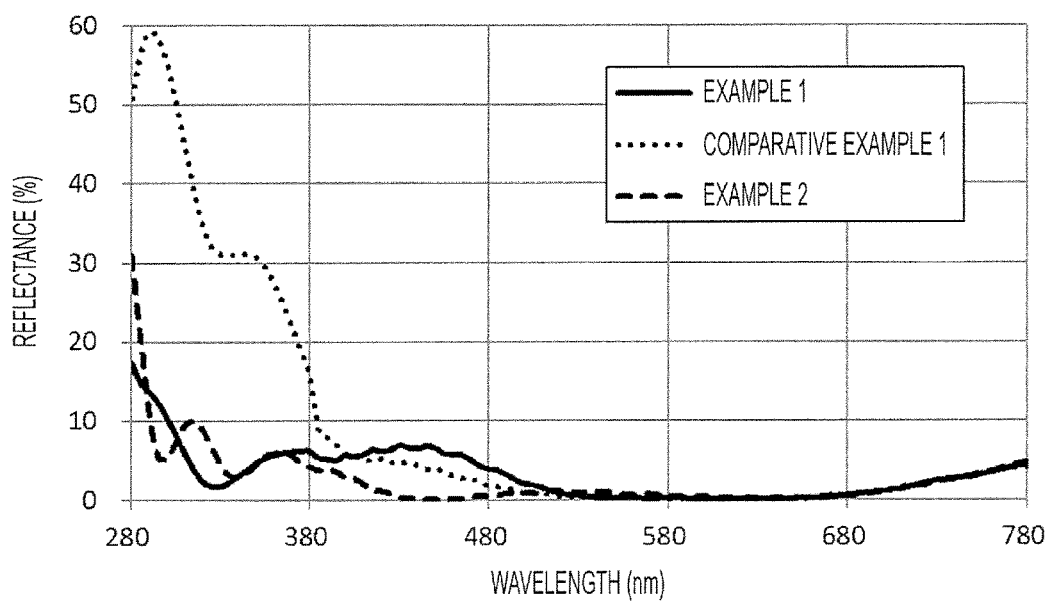
FIG. 1 is a graph showing reflection spectra obtained by measurement on an eyeball-side surface of spectacle lenses in Examples 1 and 2, and Comparative Example 1.

A spectacle lens according to an aspect of the present disclosure is a spectacle lens including a lens base material and a multilayer film provided on each surface of an eyeball-side surface and an object-side surface of the lens base material, in which a mean reflectance $R_{B(object)}$ in a wavelength range of 430 to 450 nm measured on the object-side surface of the spectacle lens is equal to or more than 1.00%, and a mean reflectance $R_{UV(eye)}$ in a wavelength range of 280 to 380 nm measured on the eyeball-side surface of the spectacle lens is less than or equal to 10.00%.

The spectacle lens is described below in more detail. Note that, a mean reflectance in the present disclosure and the present specification means the arithmetic mean value of the normal incidence reflectances in a wavelength range to be measured for each arbitrary wavelength (with an arbitrary pitch) at the optical center of a surface to be measured. For the measurement, the measurement wavelength interval (pitch) can be arbitrarily set in the range of, for example, 1 to 5 nm. Furthermore, a reflection spectral characteristic, such as a reflectance, in the present disclosure and the present specification means a normal incidence reflection spectral characteristic. Moreover, in the present disclosure and the present specification, an eyeball-side surface is a surface disposed at the eyeball side and an object-side surface is a surface disposed at the object side when a wearer wears spectacles equipped with the spectacle lens.

<Reflection Spectral Characteristic>
(Reflection Spectral Characteristic to Blue Light)

In the spectacle lens, the mean reflectance $R_{B(object)}$ in the wavelength range of 430 to 450 nm measured on the object-side surface is equal to or more than 1.00%. Furthermore, the mean reflectance $R_{B(eye)}$ in the wavelength range of 430 to 450 nm measured on the eyeball-side surface may be equal to or more than 1.00%. In other words, at least the object-side surface, each surface of the eyeball-side surface and the object-side surface may have a characteristic of reflecting incident light having the wavelength range of 430 to 450 nm (blue light reflectivity). $R_{B(object)}$ and $R_{B(eye)}$ each may be equal to or more than 2.00%, or may be equal to or more than 3.00%, or may be equal to or more than 4.00%. As the mean reflectance becomes higher, the burden of blue light on the eyes can be reduced more. On the other hand, since bluishness in the spectacle lens tends to become stronger as the mean reflectance becomes higher, $R_{B(object)}$ and $R_{B(eye)}$ each may be less than or equal to 10.00%, may be less than or equal to 9.00%, or may be less than or equal to 8.00% from the perspective for obtaining a spectacle lens having appropriate bluishness.

$R_{B(object)}$ and $R_{B(eye)}$ may be the same or different. For example, in an aspect, $R_{B(object)}$ and $R_{B(eye)}$ satisfy the relation in which the blue light reflectivity on the eyeball-side surface is larger than the object-side surface, i.e. $R_{B(object)} < R_{B(eye)}$, but are not limited to the relation.

(Reflection Spectral Characteristic to Ultraviolet)

With regard to an ultraviolet reflectivity, in an aspect, the mean reflectance $R_{UV280-380\ nm(eye)}$ in the wavelength range of 280 to 380 nm measured on the eyeball-side surface is less than or equal to 15.00%. $R_{UV280-380\ nm(eye)}$ may be less than or equal to 14.00%, or may be less than or equal to 13.50%, or may be less than or equal to 13.00%, or may be less than or equal to 12.00%, less than or equal to 11.00%, less than or equal to 10.00%, less than or equal to 9.00%, less than or equal to 8.00%, or less than or equal to 7.00%.

Furthermore, with regard to the ultraviolet reflectivity, in an aspect, the mean reflectance $R_{UV295-380\ nm(eye)}$ in the wavelength range of 295 to 380 nm measured on the eyeball-side surface is less than or equal to 20.00%. $R_{UV295-380\ nm(eye)}$ may be less than or equal to 18.00%, may be less than or equal to 15.00%, or may be less than or equal to 12.00%, or may be less than or equal to 11.00%, less than or equal to 10.00%, less than or equal to 9.00%, less than or equal to 8.00%, and less than or equal to 7.00%.

Furthermore, $R_{UV280-380\ nm(eye)}$ and $R_{UV295-380\ nm(eye)}$ are, for example, equal to or more than 1.00%, but each lower limit is not particularly limited since the amount of ultraviolet reflected on the eyeball-side surface and entering the eyes is reduced more as the mean reflectance becomes lower.

On the other hand, with regard to the ultraviolet reflectivity on the object-side surface, the mean reflectance $R_{UV280-380\ nm(object)}$ in the wavelength range of 280 to 380 nm measured on the object-side surface is not particularly limited and may be the same as, or larger or smaller than $R_{UV280-380\ nm(eye)}$. For example, in an aspect, since ultraviolet incident from the object-side surface is absorbed into an ultraviolet absorber included in the lens base material when the lens base material including the ultraviolet absorber, it is possible to reduce the amount of ultraviolet entering the eyes. Alternatively, in an aspect, by imparting a larger ultraviolet reflectivity to the object-side surface than the eyeball-side surface, $R_{UV280-380\ nm(object)} > R_{UV280-380\ nm(eye)}$ may be satisfied. Thus, by reflecting the ultraviolet incident from the object-side surface on the object-side surface, it is possible to reduce the amount of ultraviolet entering the eyes. In this case, $R_{UV280-380\ nm(object)}$ may be, for example, equal to or more than 16.00%, equal to or more than 18.00%, equal to or more than 0.00%, equal to or more than 25.00%, or equal to or more than 30.00%, and may be less than or equal to 50.00%, but is not particularly limited. Alternatively, in an aspect, $R_{UV280-380\ nm(object)}$ may be in the range described for $R_{UV280-380\ nm(eye)}$.

Furthermore, with regard to the ultraviolet reflectivity on the object-side surface, the mean reflectance $R_{UV295-380\ nm(object)}$ in the wavelength range of 295 to 380 nm measured on the object-side surface is not particularly limited and may be the same as, or larger or smaller than $R_{UV295-380\ nm(eye)}$. For example, in an aspect, since ultraviolet incident from the object-side surface is absorbed into an ultraviolet absorber included in the lens base material when the lens base material including the ultraviolet absorber, it is possible to reduce the amount of ultraviolet entering the eyes. Alternatively, in an aspect, by imparting a larger ultraviolet reflectivity to the object-side surface than the eyeball-side surface, $R_{UV295-380\ nm(object)} > R_{UV295-380\ nm(eye)}$ may be satisfied. Thus, by reflecting the ultraviolet incident from the object-side surface on the object-side surface, it is possible to reduce the amount of ultraviolet entering the eyes. In this case, $R_{UV295-380\ nm(object)}$ may be, for example, equal to or more than 21.00%, equal to or more than 22.00%, equal to or more than 25.00%, or equal to or more than 30.00%, and may be less than or equal to 50.00%, but is not particularly limited. Alternatively, in an aspect, $R_{UV295-380\ nm(object)}$ may be in the range described for $R_{UV295-380\ nm(eye)}$.

(Reflection Spectral Characteristic to Green Light and Reflection Spectral Characteristic to Red Light)

With regard to the characteristic of reflecting incident light having the green light wavelength range of 520 to 580 nm, the mean reflectance in the wavelength range of 520 to 580 nm measured on at least either surface of or may be each surface of the eyeball-side surface or/and the object-side surface may be less than or equal to 0.60%, or may be less than or equal to 0.50%. Furthermore, the mean reflectance in the wavelength range of 520 to 580 nm is, for example, equal to or more than 0.10%, but the lower limit is not limited since greenishness can be reduced as the mean reflectance becomes lower.

Furthermore, with regard to the characteristic of reflecting incident light having the red light wavelength range of 580 to 780 nm, the mean reflectance in the wavelength range of 580 to 780 nm measured on at least either surface of or preferably each surface of the eyeball-side surface or/and the object-side surface may be less than or equal to 3.00%, may be less than or equal to 2.00%, or may be less than or equal to 1.50%. Furthermore, the mean reflectance in the wavelength range of 580 to 780 nm is, for example, equal to or more than 0.50%, but the lower limit is not limited since reddishness can be reduced as the mean reflectance becomes lower.

(Dominant Wavelength)

A dominant wavelength is an index numerically expressing the wavelength of the color of light sensed with person's eyes, and is calculated in accordance with JIS Z 8701. In the spectacle lens according to an aspect of the present disclosure, it is preferable that the dominant wavelength measured on at least the object-side surface is in the wavelength range of 400 to 500 nm from the perspective of the blue light reflectivity. Furthermore, it is more preferable that the dominant wavelength measured on the eyeball-side surface is in the wavelength range of 400 to 500 nm because the spectacle lens can have the small difference between the object-side surface and the eyeball-side surface in color and a good appearance.

The inventors have inferred that the small difference between the object-side surface and the eyeball-side surface in color is preferable from the perspective for improving a wearing feeling in addition to the good appearance of the spectacle lens. The details are described below.

The reflection light incident from the rear side of a wearer of spectacles, then reflected, and entering the eyes as reflection light includes, in addition to the reflection light reflected on the eyeball-side surface, the light passing through the spectacle lens without being reflected on the eyeball-side surface, then reflected on the object-side surface, emitted from the eyeball-side surface as return light, and entering the eyes. When the color of each reflection light (reflected image color) is largely different, a wearer of spectacles feels a sense of discomfort. Hereinafter, the observation of such different reflected image color is referred to as a reflected double image. Thus, to improve a wearing feeling by reducing a sense of discomfort, it is preferable that the difference between the object-side surface and the eyeball-side surface in color is small. The difference between the reflection spectral characteristics in a region from blue light to visible light on the object-side surface and the eyeball-side surface causes the difference in the reflected image color, and it is preferable to adjust the reflection spectral characteristics to one type of light, preferably two types of light, and more preferably three types of light selected from the group consisting of three types of blue light, green light, and red light as described above on each surface of the object-side surface and eyeball-side surface from the perspective for improving a wearing feeling.

<Configuration of Spectacle Lens>

In the spectacle lens, the multilayer film provided on each surface of the eyeball-side surface and the object-side surface of the lens base material can impart the reflection spectral characteristic to the spectacle lens. The multilayer film is provided on the surface of the lens base material directly or indirectly through one or more other layers. The lens base material is not specifically limited, and can be styrene resin including (meth) acrylic resin, polycarbonate resin, allyl resin, allyl carbonate resin such as diethyleneglycol bis (allylcarbonate) resin (CR-39), vinyl resin, polyester resin, polyether resin, urethane resin obtained through reaction between an isocyanate compound and a hydroxy compound such as diethylene glycol, thiourethane resin obtained through reaction between an isocyanate compound and a polythiol compound, transparent resin obtained by curing a polymerizable composition containing a (thio) epoxy compound having one or more intermolecular disulfide bonds, or the like. Furthermore, inorganic glass may be used. Note that, the lens base material may not be dyed (a clear lens) or may be dyed (a dyed lens). The refractive index of the lens base material is, for example, approximately 1.60 to 1.75. However, the refractive index of the lens base material is not limited to the above, and may be within the above range, or over or under the above range.

The spectacle lens may be various lenses, such as a monofocal lens, a multifocal lens, or a progressive power lens. A type of the lens is determined based on the shapes of both surfaces of the lens base material. Furthermore, the lens base material surface may be a convex surface, a concave surface, or a flat surface. In a common lens base material and spectacle lens, the object-side surface is a convex surface, and the eyeball-side surface is a concave surface. However, the present disclosure is not limited to the above.

The multilayer film for imparting the reflection spectral characteristic may be provided on the lens base material surface directly or indirectly through one or more other layers. A layer which can be formed between the lens base material and the multilayer film is, for example, a hard coat layer (hereinafter, also referred to as a "hard coat"). By providing a hard coat layer, it is possible to impart flaw resistance (abrasion resistance) to the spectacle lens and to improve durability (strength) of the spectacle lens. With regard to the details of the hard coat layer, for example, the paragraphs 0025 to 0028 and 0030 of JP 2012-128135 A can be referred to. Furthermore, a primer layer may be formed between the lens base material and the coat to enhance adhesion. With regard to the details of the primer layer, for example, the paragraphs 0029 to 0030 of JP 2012-128135 A can be referred to.

The multilayer film provided on each surface of the eyeball-side surface and the object-side surface of the lens base material is not particularly limited as long as the one imparts the above reflection spectral characteristic to the spectacle lens surface having the multilayer film. Such a multilayer film can be formed by sequentially laminating a high refractive index layer and a low refractive index layer. More specifically, the multilayer film can be formed by determining the film thickness of each layer through optical simulation by a known method based on a refractive index of a film material for forming the high refractive index layer and the low refractive index layer and the wavelength of light to be reflected and light the reflection of which is to be reduced, and then sequentially laminating the high refractive index layer and the low refractive index layer under film formation conditions determined such that the determined film thickness is achieved. The film forming material may be an inorganic material, an organic material, or an organic-inorganic composite material, and may be an inorganic material from the perspective of film formation and ease of availability. By adjusting the type, the film thickness, the laminating order, or the like of the film forming material, it is possible to control the reflection spectral characteristic to each of blue light, ultraviolet, green light, and red light.

A high refractive index material for forming the high refractive index layer can be a mixture of one or more oxides selected from the group consisting of zirconium oxide (for example, $ZrO_2$), tantalum oxide ($Ta_2O_5$), titanium oxide (for example, $TiO_2$), aluminum oxide ($Al_2O_3$), yttrium oxide (for example, $Y_2O_3$), hafnium oxide (for example, $HfO_2$), and niobium oxide (for example, $Nb_2O_5$). On the other hand, a low refractive index material for forming the low refractive index layer can be a mixture of one or more oxides or fluorides selected from the group consisting of silicon oxide (for example, $SiO_2$), magnesium fluoride (for example, $MgF_2$), and barium fluoride (for example, $BaF_2$). Note that, in the above examples, oxide and fluoride are expressed in a stoichiometric composition for convenience, but oxide or fluoride in which oxygen or fluorine is deficient or excessive as compared to the stoichiometric composition may also be used as a high refractive index material or a low refractive index material.

The film thickness of each layer included in the multilayer film can be determined through optical simulation as described above. A layer configuration of the multilayer film can be, for example, a configuration in which, a first layer (low refractive index layer), a second layer (high refractive index layer), a third layer (low refractive index layer), a fourth layer (high refractive index layer), a fifth layer (low refractive index layer), a sixth layer (high refractive index layer), and a seventh layer (low refractive index layer) are laminated in this order from the lens base material to the outermost side of the lens, a configuration in which a first layer (high refractive index layer), a second layer (low refractive index layer), a third layer (high refractive index layer), a fourth layer (low refractive index layer), a fifth layer (high refractive index layer), and a sixth layer (low refractive index layer) are laminated in this order from the lens base material to the outermost side of the lens, or the like. A preferable combination of a low refractive index layer and a high refractive index layer can be, for example, a combination of a coat including silicon oxide as the principal component and a coat including zirconium oxide as the principal component, and a combination of a coat including silicon oxide as the principal component and a coat including niobium oxide as the principal component, and a preferable multilayer film can be, for example, a multilayer film including at least one laminated structure in which the coats of these two layers are adjacent.

Each layer may be a coat including the high refractive index material or the low refractive index material as the principal component. Here, the principal component is a component which accounts for the largest part of the coat and usually accounts for approximately 50 to 100 mass %, or even 90 to 100 mass %. Such a coat can be formed by the film formation using the film forming material including the above material (for example, a vapor deposition source) as the principal component. Note that the principal component of the film forming material is the same as the above. The coat and the film forming material can include a minute amount of impurities which are inevitably mixed, and may include another component such as another inorganic substance or a known additive component which supports the film formation as long as the component does not degrade the function of the principal component. The film formation can be performed by a known film formation method, and preferably by vapor deposition from the perspective of ease of the film formation. The vapor deposition in the present disclosure includes a dry method such as a vacuum vapor deposition method, an ion plating method, or a sputtering method. In the vacuum vapor deposition method, an ion beam assist method in which an ion beam is applied concurrently to vapor deposition may be used.

The multilayer film may also include, in addition to the above high refractive index layer and low refractive index layer, a coat including conductive oxide as the principal component, preferably one or more conductive oxide layers formed by vapor deposition using a vapor deposition source including conductive oxide as the principal component in an arbitrary position in the multilayer film. Indium oxide, tin oxide, zinc oxide, tantalum oxide, or composite oxide thereof which is known as transparent conductive oxide may be used as the conductive oxide from the perspective of transparency of the spectacle lens. The conductive oxide especially preferable from the perspective of transparency and conductivity can be tin oxide or indium-tin oxide (ITO). By including the conductive oxide layer, it is possible to prevent adherence of dust to the charged spectacle lens.

Furthermore, a functional film may be further formed on the multilayer film. The functional film can be various functional films of a water repellent or hydrophilic antifouling film, an anti-fogging film, a polarizing film, a dimming film, or the like. Any known techniques can be applied to the functional films without any restriction.

[Spectacles]

In another aspect of the present disclosure, it is possible to provide spectacles including a spectacle lens according to an aspect of the present disclosure and a frame equipped with the spectacle lens. The spectacle lens has been detailedly described above. Any known techniques can be applied to a structure of other spectacles without any restriction.

EXAMPLES

The present disclosure is described in detail by Examples below, but is not limited to the aspects described by Examples. In the following description, a refractive index is a refractive index of the wavelength 500 nm.

Examples 1 to 3 and Comparative Examples 1 and 2

On a hard coat surface on a convex surface side (object side) of a plastic lens base material (see Tables 2 and 3: a clear lens), each surface of which was optically finished and subjected to hard coating in advance in which the object-side surface was a convex surface and the eyeball-side surface was a concave surface, a multilayer vapor deposition film having eight layers in total was sequentially formed by ion assisted deposition using oxygen gas and nitrogen gas as assist gas. As the lens base materials shown in Tables 2 and 3, the material having the refractive index 1.60 is product name EYAS manufactured by HOYA Corporation, and the material having the refractive index 1.67 is product name EYNOA manufactured by HOYA Corporation.

On the hard coat surface on the concave surface side (eyeball side), a multilayer vapor deposition film having eight layers in total was laminated by the ion assisted deposition under the same condition, and a spectacle lens was thus obtained.

In Examples and Comparative Examples, the multilayer vapor deposition film was formed such that, on each side of the convex surface side and the concave surface side, the first layer, the second layer . . . were laminated in this order from the lens base material side (hard coat side) to the spectacle lens surface and the outermost layer on the spectacle lens surface side was to be the eighth layer using the vapor deposition sources shown in Table 1. In Examples and Comparative Example, the vapor deposition sources consisting of the following oxide except for impurities which can be inevitably mixed were used. In Examples and Comparative Examples, the reflection spectral characteristic was controlled by changing the film thickness of one or more following layers.

In Comparative Examples 1 and 2, a multilayer vapor deposition film having a same configuration was formed on each surface of the object-side surface and eyeball-side surface.

On the other hand, in Examples 1 and 2, the multilayer vapor deposition film manufactured in Comparative Example 1 was formed on the object-side surface, and a multilayer vapor deposition film different from the object-side surface was formed on the eyeball-side surface.

In Example 3, the multilayer vapor deposition film manufactured in Comparative Example 2 was formed on the object-side surface, and a multilayer vapor deposition film different from the object-side surface was formed on the eyeball-side surface.

TABLE 1

| | Vapor deposition source |
|---|---|
| First layer | $SiO_2$ |
| Second layer | $ZrO_2$ |
| Third layer | $SiO_2$ |

TABLE 1-continued

| | Vapor deposition source |
|---|---|
| Fourth layer | $ZrO_2$ |
| Fifth layer | $SiO_2$ |
| Sixth layer | $ZrO_2$ |
| Seventh layer | ITO |
| Eighth layer | $SiO_2$ |

<Evaluation Method>
1. Measurement of Reflection Spectral Characteristic

Figure 2:
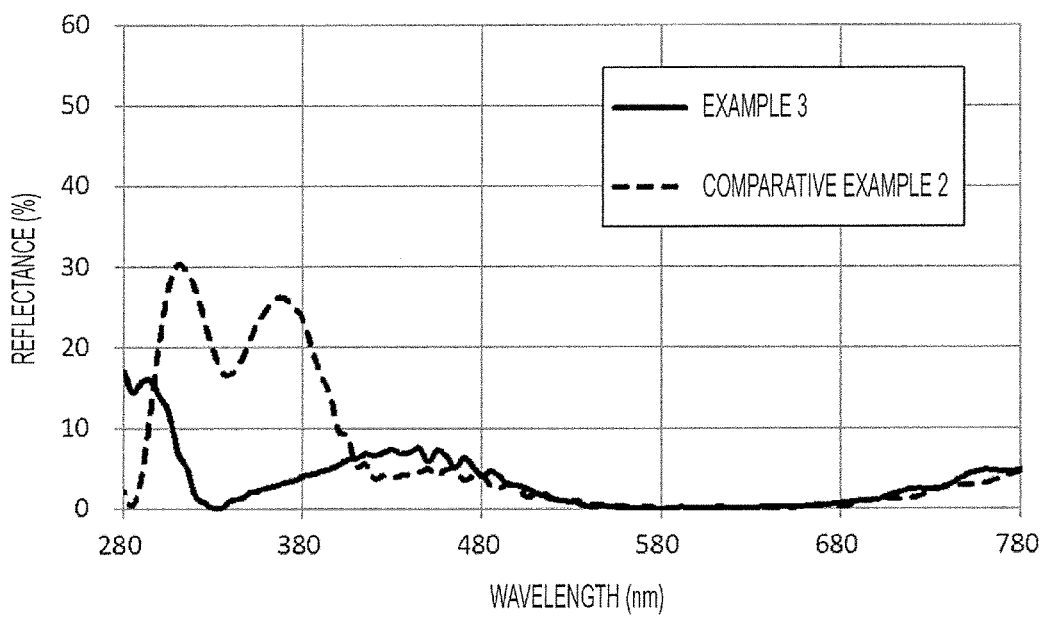
FIG. 2 is a graph showing reflection spectra obtained by measurement on an eyeball-side surface of spectacle lenses in Example 3 and Comparative Example 2.

At the optical center of the object-side surface (convex surface side) and the eyeball-side surface (concave surface side) of each spectacle lens in Examples 1 to 3 and Comparative Examples 1 and 2, the normal incidence reflection spectral characteristic in the wavelength range of 280 to 780 nm was measured (with the measurement pitch: 1 nm) using a spectrophotometer U4100 manufactured by Hitachi, Ltd. In order to suppress reflection from a non-measurement surface, the non-measurement surface was painted lusterless black as described in Section 5.2 of JIS T 7334. FIG. 1 shows the reflection spectra obtained by measurement on the eyeball-side surface of the spectacle lenses in Examples 1 and 2, and Comparative Example 1. FIG. 2 shows the reflection spectra obtained by measurement on the eyeball-side surface of the spectacle lenses in Example 3 and Comparative Example 2. The reflection spectral characteristics shown in Tables 2 and 3 were acquired from the measurement results. The dominant wavelengths shown in Tables 2 and 3 were calculated from the measurement result in accordance with JIS Z 8701.

2. Reflected Double Image (Reflected Image Color Difference) Evaluation

The spectacle lenses in Examples 1 to 3 and Comparative Examples 1 and 2 were observed at the position of 30 cm from the eyeball side under fluorescent light in a dark room, and the occurrence and degree of the reflected double image were organoleptically evaluated by the eyes of an observer based on the following evaluation criteria.

A: reflected double image is not or seldom observed.
B: reflected double image is observed (more severe than A).
C: reflected double image is remarkably observed.

The above results are shown in Tables 2 and 3.

TABLE 2

Reflection spectral characteristic of object-side surface (convex surface)

| | Refractive index of lens base material | Mean reflectance in wavelength range of 430-450 nm $R_{B\ (object)}$ (%) | Mean reflectance in wavelength range of 280-380 nm $RUV_{280\text{-}380\ nm\ (object)}$ (%) | Mean reflectance in wavelength range of 520-580 nm (%) | Mean reflectance in wavelength range of 580-780 nm (%) | Wavelength having maximum reflectance in wavelength range of 380-500 nm (nm) | Dominant wavelength (nm) |
|---|---|---|---|---|---|---|---|
| Example 1 | 1.60 | 4.85 | 36.86 | 0.30 | 1.29 | 380 | 463 |
| Example 2 | 1.60 | 4.85 | 36.86 | 0.30 | 1.29 | 380 | 463 |
| Comparative Example 1 | 1.60 | 4.85 | 36.86 | 0.30 | 1.29 | 380 | 463 |

Reflection spectral characteristic of eyeball-side surface (concave surface)

| | Mean reflectance in wavelength range of 430-450 nm $R_{B\ (object)}$ (%) | Mean reflectance in wavelength range of 280-380 nm $RUV_{280\text{-}380\ nm\ (object)}$ (%) | Mean reflectance in wavelength range of 520-580 nm (%) | Mean reflectance in wavelength range of 580-780 nm (%) | Wavelength having maximum reflectance in wavelength range of 380-500 nm (nm) | Dominant wavelength (nm) | Reflected double image evaluation |
|---|---|---|---|---|---|---|---|
| Example 1 | 6.96 | 6.82 | 0.40 | 1.35 | 430 | 465 | A |
| Example 2 | 0.38 | 8.03 | 0.90 | 1.41 | 380 | 526 | C |
| Comparative Example 1 | 4.85 | 36.86 | 0.30 | 1.29 | 380 | 463 | A |

TABLE 3

Reflection spectral characteristic of object-side surface (convex surface)

| | Refractive index of lens base material | Mean reflectance in wavelength range of 430-450 nm $R_{B\ (object)}$ (%) | Mean reflectance in wavelength range of 280-380 nm $RUV_{280\text{-}380\ nm\ (object)}$ (%) | Mean reflectance in wavelength range of 520-580 nm (%) | Mean reflectance in wavelength range of 580-780 nm (%) | Wavelength having maximum reflectance in wavelength range of 380-500 nm (nm) | Dominant wavelength (nm) |
|---|---|---|---|---|---|---|---|
| Example 3 | 1.67 | 4.98 | 19.97 | 0.57 | 1.23 | 380 | 470 |
| Comparative | 1.67 | 4.98 | 19.97 | 0.57 | 1.23 | 380 | 470 |

TABLE 3-continued

Example 2

| | Reflection spectral characteristic of eyeball-side surface (concave surface) | | | | | | |
|---|---|---|---|---|---|---|---|
| | Mean reflectance in wavelength range of 430-450 nm $R_{B\ (object)}$ (%) | Mean reflectance in wavelength range of 280-380 nm $RUV_{280\text{-}380\ nm\ (object)}$ (%) | Mean reflectance in wavelength range of 520-580 nm (%) | Mean reflectance in wavelength range of 580-780 nm (%) | Wavelength having maximum reflectance in wavelength range of 380-500 nm (nm) | Dominant wavelength (nm) | Reflected double image evaluation |
| Example 3 | 7.59 | 6.11 | 0.42 | 1.56 | 445 | 467 | A |
| Comparative Example 2 | 4.98 | 19.97 | 0.57 | 1.23 | 380 | 470 | A |

Each spectacle lens in Comparative Examples 1 and 2 is a spectacle lens in which the mean reflectance $R_{UV(eye)}$ in the wavelength range of 280 to 380 nm measured on the eyeball-side surface is more than 10.00%. Such a spectacle lens easily causes asthenopia or ocular pain in the case of long time use since the amount of ultraviolet incident from the rear side of a wearer of spectacles, reflected on the eyeball-side surface, and entering the eyes is large.

Each spectacle lens in Examples 1 to 3 has the blue light reflectivity on the object-side surface, and has the ultraviolet low reflectivity on the eyeball-side surface. Furthermore, each spectacle lens in Examples 1 and 3 has the blue light reflectivity in addition to the ultraviolet low reflectivity on the eyeball-side surface. In contrast, the spectacle lens in Example 2 does not have the blue light reflectivity on the eyeball-side surface. According to the spectacle lens, it is possible to suppress both blue light incident from the front side of the spectacle lens and ultraviolet incident from the rear side from burdening the eyes.

Furthermore, as shown in Tables 2 and 3, it has been confirmed that each spectacle lens in Example 1 and 3 suppressed the occurrence of the reflected double image compared to the spectacle lens in Example 2. Furthermore, by observing the appearance, the object-side surface of the spectacle lens in Example 2 became bluish, and the eyeball-side surface was greenish. In contrast, the object-side surface and the eyeball-side surface of each spectacle lens in Example 1 and 3 were bluish, the difference between both surfaces in color was small, and the appearance was good.

Examples 4 to 6 and Comparative Example 3

On a hard coat surface on a convex surface side (object side) of a plastic lens base material (see Tables 4 to 7: a clear lens), each surface of which was optically finished and subjected to hard coating in advance in which the object-side surface was a convex surface and the eyeball-side surface was a concave surface, a multilayer vapor deposition film having eight layers in total in Examples 4 and 5 and Comparative Example 3, and a multilayer vapor deposition film having seven layers in total in Example 6 were formed by ion assisted deposition using oxygen gas and nitrogen gas as assist gas. As the lens base materials shown in Tables 4 to 7, the material having the refractive index 1.60 is product name EYAS manufactured by HOYA Corporation, and the material having the refractive index 1.67 is product name EYNOA manufactured by HOYA Corporation. Furthermore, a hard coat (HC) having the refractive index shown in Tables 4 to 7 and the film thickness shown in Tables 4 to 7 was formed on each surface of each lens base material.

On the hard coat surface on the concave surface side (eyeball side), a multilayer vapor deposition film having eight layers in total in Examples 4 and 5 and Comparative Example 3, and seven layers in total in Example 6 was laminated by the ion assisted deposition under the same condition, and a spectacle lens was thus obtained.

In Examples 4 to 6 and Comparative Example 3, the multilayer vapor deposition film was formed such that, on each side of the convex surface side and the concave surface side, the first layer, the second layer . . . were laminated in this order from the lens base material side (hard coat side) to the spectacle lens surface, and the outermost layer on the spectacle lens surface side was to be the eighth layer in Examples 4 and 5 and Comparative Example 3, or to be the seventh layer in Example 6 using the vapor deposition sources shown in Tables 4 to 7. In Examples 4 to 6 and Comparative Example 3, a multilayer vapor deposition film was obtained by sequentially forming the vapor deposition films having the film thickness shown in Table 4 to 7 using the vapor deposition sources consisting of the oxide shown in Table 3 except for impurities which can be inevitably mixed.

TABLE 4

| | | | Example 4 | | | |
|---|---|---|---|---|---|---|
| | | | Object side | | Eyeball side | |
| | Material name | Refractive index | Physical film thickness (nm) | Optical film thickness ($\lambda$ = 500 nm) | Physical film thickness (nm) | Optical film thickness ($\lambda$ = 500 nm) |
| Base material | EYAS | 1.60 | — | — | — | — |
| Hard coat | HC | 1.62 | 2500 | 8.100 $\lambda$ | 2500 | 8.100 $\lambda$ |
| First layer | SiO$_2$ | 1.46 | 30.1 | 0.088 $\lambda$ | 24.9 | 0.073 $\lambda$ |
| Second layer | ZrO$_2$ | 2.09 | 8.0 | 0.033 $\lambda$ | 6.0 | 0.025 $\lambda$ |

TABLE 4-continued

| | | | Example 4 | | | |
|---|---|---|---|---|---|---|
| | | | Object side | | Eyeball side | |
| | Material name | Refractive index | Physical film thickness (nm) | Optical film thickness ($\lambda$ = 500 nm) | Physical film thickness (nm) | Optical film thickness ($\lambda$ = 500 nm) |
| Third layer | $SiO_2$ | 1.46 | 382.5 | 1.117 $\lambda$ | 404.4 | 1.181 $\lambda$ |
| Fourth layer | $ZrO_2$ | 2.09 | 17.4 | 0.073 $\lambda$ | 22.8 | 0.095 $\lambda$ |
| Fifth layer | $SiO_2$ | 1.46 | 33.7 | 0.098 $\lambda$ | 31.3 | 0.091 $\lambda$ |
| Sixth layer | $ZrO_2$ | 2.09 | 45.5 | 0.190 $\lambda$ | 12.7 | 0.053 $\lambda$ |
| Seventh layer | ITO | 2.10 | 5.0 | 0.021 $\lambda$ | 5.0 | 0.021 $\lambda$ |
| Eighth layer | $SiO_2$ | 1.46 | 109.3 | 0.319 $\lambda$ | 102.7 | 0.300 $\lambda$ |

TABLE 5

| | | | Example 5 | | | |
|---|---|---|---|---|---|---|
| | | | Object side | | Eyeball side | |
| | Material name | Refractive index | Physical film thickness (nm) | Optical film thickness ($\lambda$ = 500 nm) | Physical film thickness (nm) | Optical film thickness ($\lambda$ = 500 nm) |
| Base material | EYNOA | 1.67 | — | — | — | — |
| Hard coat | HC | 1.68 | 2500 | 8.400 $\lambda$ | 2500 | 8.400 $\lambda$ |
| First layer | $SiO_2$ | 1.46 | 32.3 | 0.094 $\lambda$ | 27.5 | 0.080 $\lambda$ |
| Second layer | $ZrO_2$ | 2.09 | 10.4 | 0.043 $\lambda$ | 8.2 | 0.034 $\lambda$ |
| Third layer | $SiO_2$ | 1.46 | 375.5 | 1.096 $\lambda$ | 405.7 | 1.185 $\lambda$ |
| Fourth layer | $ZrO_2$ | 2.09 | 18.8 | 0.079 $\lambda$ | 21.7 | 0.091 $\lambda$ |
| Fifth layer | $SiO_2$ | 1.46 | 29.4 | 0.086 $\lambda$ | 31.3 | 0.091 $\lambda$ |
| Sixth layer | $ZrO_2$ | 2.09 | 56.4 | 0.236 $\lambda$ | 12.7 | 0.053 $\lambda$ |
| Seventh layer | ITO | 2.10 | 5.0 | 0.021 $\lambda$ | 5.0 | 0.021 $\lambda$ |
| Eighth layer | $SiO_2$ | 1.46 | 104.8 | 0.306 $\lambda$ | 103.5 | 0.302 $\lambda$ |

TABLE 6

| | | | Example 6 | | | |
|---|---|---|---|---|---|---|
| | | | Object side | | Eyeball side | |
| | Material name | Refractive index | Physical film thickness (nm) | Optical film thickness (500 nm) | Physical film thickness (nm) | Optical film thickness (500 nm) |
| Base material | EYAS | 1.60 | — | — | — | — |
| Hard coat | HC | 1.62 | 2500 | 8.100 $\lambda$ | 2500 | 8.100 $\lambda$ |
| First layer | $SiO_2$ | 1.46 | 16.5 | 0.048 $\lambda$ | 29.8 | 0.087 $\lambda$ |
| Second layer | $Nb_2O_5$ | 2.25 | 3.4 | 0.015 $\lambda$ | 2.1 | 0.009 $\lambda$ |
| Third layer | $SiO_2$ | 1.46 | 201.2 | 0.588 $\lambda$ | 198.6 | 0.580 $\lambda$ |
| Fourth layer | $Nb_2O_5$ | 2.25 | 16.2 | 0.073 $\lambda$ | 16.9 | 0.076 $\lambda$ |
| Fifth layer | $SiO_2$ | 1.46 | 37.6 | 0.110 $\lambda$ | 34.8 | 0.102 $\lambda$ |
| Sixth layer | $Nb_2O_5$ | 2.25 | 31.2 | 0.140 $\lambda$ | 16.3 | 0.073 $\lambda$ |
| Seventh layer | $SiO_2$ | 1.46 | 112.8 | 0.329 $\lambda$ | 109.0 | 0.318 $\lambda$ |

TABLE 7

| | | | Comparative Example 3 | | | |
|---|---|---|---|---|---|---|
| | | | Object side | | Eyeball side | |
| | Material name | Refractive index | Physical film thickness (nm) | Optical film thickness (500 nm) | Physical film thickness (nm) | Optical film thickness (500 nm) |
| Base material | EYNOA | 1.67 | — | — | — | — |
| Hard coat | HC | 1.68 | 2500 | 8.400 $\lambda$ | 2500 | 8.400 $\lambda$ |
| First layer | $SiO_2$ | 1.46 | 32.3 | 0.094 $\lambda$ | 32.3 | 0.094 $\lambda$ |

TABLE 7-continued

| | | | Comparative Example 3 | | | |
|---|---|---|---|---|---|---|
| | | | Object side | | Eyeball side | |
| | Material name | Refractive index | Physical film thickness (nm) | Optical film thickness (500 nm) | Physical film thickness (nm) | Optical film thickness (500 nm) |
| Second layer | $ZrO_2$ | 2.09 | 10.4 | 0.043 λ | 10.4 | 0.043 λ |
| Third layer | $SiO_2$ | 1.46 | 375.5 | 1.096 λ | 375.5 | 1.096 λ |
| Fourth layer | $ZrO_2$ | 2.09 | 18.8 | 0.079 λ | 18.8 | 0.079 λ |
| Fifth layer | $SiO_2$ | 1.46 | 29.4 | 0.086 λ | 29.4 | 0.086 λ |
| Sixth layer | $ZrO_2$ | 2.09 | 56.4 | 0.236 λ | 56.4 | 0.236 λ |
| Seventh layer | ITO | 2.10 | 5.0 | 0.021 λ | 5.0 | 0.021 λ |
| Eighth layer | $SiO_2$ | 1.46 | 104.8 | 0.306 λ | 104.8 | 0.306 λ |

<Evaluation Method>
1. Measurement of Reflection Spectral Characteristic

Figure 3:
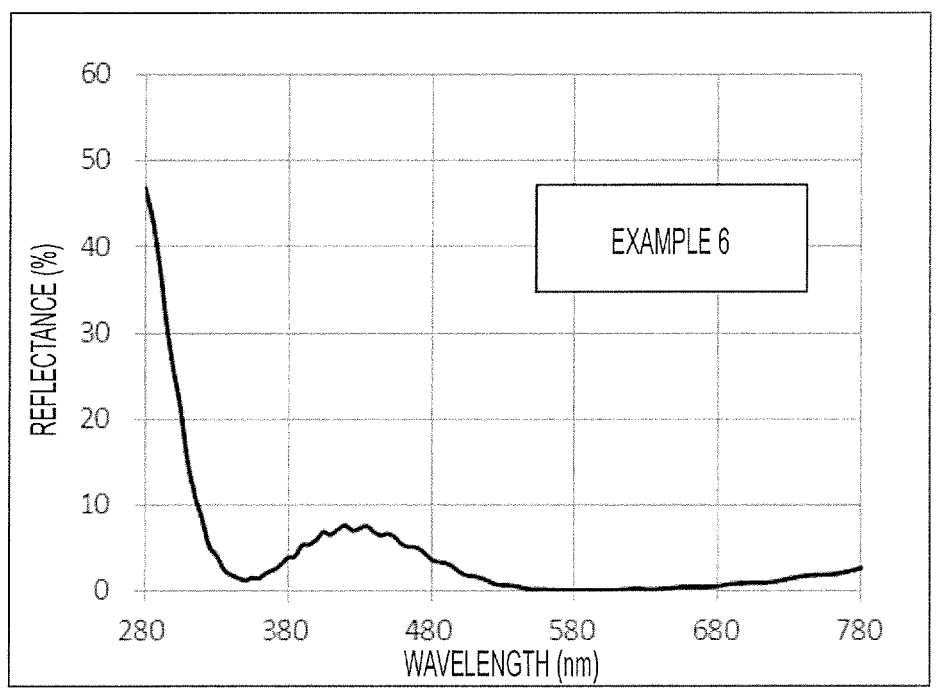
FIG. 3 is a graph showing a reflection spectrum obtained by measurement on an eyeball-side surface of a spectacle lens in Example 6.

At the optical center of the object-side surface (convex surface side) and the eyeball-side surface (concave surface side) of each spectacle lens in Examples 4 to 6 and Comparative Example 3, the normal incidence reflection spectral characteristic in the wavelength range of 280 to 780 nm was measured (with the measurement pitch: 1 nm) using a spectrophotometer U4100 manufactured by Hitachi, Ltd. In order to suppress reflection from a non-measurement surface, the non-measurement surface was painted lusterless black as described in Section 5.2 of JIS T 7334. The reflection spectral characteristics shown in Table 8 were acquired from the reflection spectra obtained by the measurement. The dominant wavelength shown in Table 8 was calculated from the measurement result in accordance with JIS Z 8701. FIG. 3 shows the reflection spectrum obtained by measurement on the eyeball-side surface of the spectacle lens in Example 6.

low reflectivity on the eyeball-side surface. According to the spectacle lens, it is possible to suppress both blue light incident from the front side of the spectacle lens and ultraviolet incident from the rear side from burdening the eyes.

Furthermore, the reflected double image (reflected image color difference) evaluation was performed to each spectacle lens in Examples 4 to 6 in the same method as the evaluation to each spectacle lens in Examples 1 to 3 and Comparative Examples 1 and 2, and the evaluation result of each spectacle lens was A.

The embodiment disclosed herein is an example in every respect and should not be restrictively understood. The scope of the present disclosure is described not by the above description but by claims, and includes all modifications equivalent to and in claims.

The present disclosure is useful in the field of manufacturing spectacle lenses and spectacles.

TABLE 8

| | Example 4 | | Example 5 | | Example 6 | | Comparative Example 3 | |
|---|---|---|---|---|---|---|---|---|
| | Object side | Eyeball side | Object side | Eyeball side | Object side | Eyeball side | Object side | Eyeball side |
| Mean reflectance (wavelength range: 430-450 nm); $R_B$ | 4.35% | 6.71% | 4.38% | 6.99% | 4.12% | 7.03% | 4.38% | 4.38% |
| Mean reflectance (wavelength range: 520-580 nm) | 0.30% | 0.40% | 0.57% | 0.42% | 0.30% | 0.45% | 0.57% | 0.57% |
| Mean reflectance (wavelength range: 580-780 nm) | 1.29% | 1.35% | 1.23% | 1.56% | 0.72% | 0.94% | 1.23% | 1.23% |
| Mean reflectance (wavelength range: 280-380 nm); $Ruv_{280-380\ nm}$ | 36.86% | 6.82% | 19.97% | 6.11% | 38.68% | 13.03% | 19.97% | 19.97% |
| Mean reflectance (wavelength range: 295-380 nm); $Ruv_{295-380\ nm}$ | 33.80% | 5.38% | 22.92% | 4.49% | 35.66% | 8.07% | 22.92% | 22.92% |
| Wavelength having maximum reflectance in wavelength range of 380-500 nm | 380 nm | 430 nm | 380 nm | 445 nm | 380 nm | 435 nm | 380 nm | 380 nm |
| Dominant wavelength | 463 nm | 465 nm | 470 nm | 467 nm | 466 nm | 466 nm | 470 nm | 470 nm |

In the spectacle lens in Comparative Example 3, the mean reflectance $R_{UV280-380\ nm(eye)}$ in the wavelength range of 280 to 380 nm measured on the eyeball-side surface is more than 15.00%, and the mean reflectance $R_{UV295-380\ nm(eye)}$ in the wavelength range of 295 to 380 nm measured on the eyeball-side surface is more than 20.00%. Such a spectacle lens easily causes asthenopia or ocular pain in the case of long time use since the amount of ultraviolet incident from the rear side of a wearer of spectacles, reflected on the eyeball-side surface, and entering the eyes is large.

Each spectacle lens in Examples 4 to 6 has the blue light reflectivity on the object-side surface, and has the ultraviolet

The invention claimed is:

1. A spectacle lens comprising:
   a lens base material; and
   a multilayer film provided on each surface of an eyeball-side surface and an object-side surface of the lens base material,
   wherein:
   a mean reflectance $R_{B(object)}$ in a wavelength range of 430 to 450 nm measured on the object-side surface of the spectacle lens is equal to or more than 2.00% and less than or equal to 10.00%, a mean reflectance $R_{B(eye)}$ in the wavelength range of 430 to 450 nm measured on the eyeball-side surface of the spectacle lens is greater than the mean reflectance $R_{B(object)}$, and a mean reflectance $R_{UV(eye)}$ over the entire wavelength range of 280 to 380 nm measured on the eyeball-side surface of the spectacle lens is greater than or equal to 6.11% and less than or equal to 15.00%.

2. The spectacle lens according to claim 1, wherein the mean reflectance $R_{B(eye)}$ is equal to or more than 2.00% and less than or equal to 10.00%.

3. The spectacle lens according to claim 1, wherein a maximum reflectance in a wavelength range of 380 to 500 nm measured on the eyeball-side surface of the spectacle lens is in a wavelength range of 400 to 480 nm.

4. The spectacle lens according to claim 1, wherein a mean reflectance in a wavelength range of 520 to 580 nm measured on the eyeball-side surface of the spectacle lens and a mean reflectance in a wavelength range of 520 to 580 nm measured on the object-side surface each are less than or equal to 0.60%, and a mean reflectance in a wavelength range of 580 to 780 nm measured on the eyeball-side surface of the spectacle lens and a mean reflectance in a wavelength range of 580 to 780 nm measured on the object-side surface each are less than or equal to 3.00%.

5. The spectacle lens according to claim 1, wherein the multilayer film provided on the eyeball-side surface of the lens base material and the multilayer film provided on the object-side surface of the lens base material each are a multilayer film in which a plurality of coats including an inorganic material as a principal component is laminated.

6. The spectacle lens according to claim 5, wherein the multilayer film provided on the eyeball-side surface of the lens base material and/or the multilayer film provided on the object-side surface of the lens base material includes at least one laminated structure in which a coat including silicon oxide as a principal component and a coat including zirconium oxide as a principal component are adjacent.

7. The spectacle lens according to claim 5, wherein the multilayer film provided on the eyeball-side surface of the lens base material and/or the multilayer film provided on the object-side surface of the lens base material includes at least one laminated structure in which a coat including silicon oxide as a principal component and a coat including niobium oxide as a principal component are adjacent.

8. The spectacle lens according to claim 5, wherein the multilayer film provided on the eyeball-side surface of the lens base material and/or the multilayer film provided on the object-side surface of the lens base material includes at least one layer of a coat including conductive oxide as a principal component.

9. The spectacle lens according to claim 5, wherein the coats are a vapor deposition film.

10. Spectacles comprising:
a spectacle lens according to claim 1; and
a frame equipped with the spectacle lens.

* * * * *